US008662606B2

(12) United States Patent
Santmyer et al.

(10) Patent No.: US 8,662,606 B2
(45) Date of Patent: Mar. 4, 2014

(54) DRAWER ASSEMBLY AND ASSOCIATED METHOD FOR CONTROLLABLY LIMITING THE SLIDEABLE EXTENSION OF A DRAWER

(75) Inventors: Paul Santmyer, Canonsburg, PA (US); Todd Kijowski, Natrona Heights, PA (US)

(73) Assignee: McKesson Automation Inc., Cranberry, PA (US)

( * ) Notice: Subject to any disclaimer, the term of this patent is extended or adjusted under 35 U.S.C. 154(b) by 0 days.

(21) Appl. No.: 13/050,215

(22) Filed: Mar. 17, 2011

(65) Prior Publication Data

US 2012/0235550 A1 Sep. 20, 2012

(51) Int. Cl.
*A47B 95/02* (2006.01)
*G06F 17/00* (2006.01)

(52) U.S. Cl.
USPC .......................................... 312/319.7; 700/242

(58) Field of Classification Search
USPC ................ 312/209, 330.1, 334.1, 333, 348.3, 312/319.5, 319.7, 215; 221/151-153; 700/236, 240, 242, 243
See application file for complete search history.

(56) References Cited

U.S. PATENT DOCUMENTS 1,334,712 A * 3/1920 Olson ......................... 312/234.1
2,522,896 A * 9/1950 Rifkin et al. .................. 221/260
2,895,781 A * 7/1959 Latter et al. ................ 312/319.7
4,717,042 A 1/1988 McLaughlin
4,785,969 A 11/1988 McLaughlin
4,847,764 A 7/1989 Halvorson
4,915,437 A * 4/1990 Cherry .......................... 296/37.6
5,014,875 A * 5/1991 McLaughlin et al. ............ 221/2
5,031,975 A * 7/1991 Anderson .................. 312/319.7
5,087,107 A * 2/1992 Fumanelli ..................... 312/333
5,159,581 A * 10/1992 Agans ............................. 368/10
5,190,185 A 3/1993 Blechl
5,292,029 A 3/1994 Pearson
5,314,243 A 5/1994 McDonald et al.

(Continued)

FOREIGN PATENT DOCUMENTS

WO WO 2009153756 A1 * 12/2009 .............. G07F 11/60

OTHER PUBLICATIONS

Ezy-Dose 7 Day AM/PM Push Button Pill Reminder [online] [retrieved Feb. 18, 2011]. Retrieved from the Internet: <URL: http://www.medichest.com/ezy-dose7dayampmpushbuttonpillreminderea.html>. 1 page.

(Continued)

*Primary Examiner* — Darnell Jayne
*Assistant Examiner* — Kimberley S Wright
(74) *Attorney, Agent, or Firm* — Alston & Bird LLP

(57) ABSTRACT

A cabinet, a drawer assembly and an associated method are provided for controllably limiting the slideable extension of a drawer relative to a cabinet body. The cabinet is configured to store a plurality of medications and includes a cabinet body and a drawer assembly that, in turn, includes a drawer slideably disposed within the cabinet body and an extension control rod. The drawer may include a plurality of pockets for storing respective medications. The drawer may also include an outwardly extending engagement member. The extension control rod may include a plurality of outwardly extending projections that are arranged helically about the rod. As such, engagement of a projection of the extension control rod with the engagement member of the drawer limits further slideable extension of the drawer relative to the cabinet body.

20 Claims, 4 Drawing Sheets

(56) References Cited

U.S. PATENT DOCUMENTS 5,346,297 A 9/1994 Colson, Jr. et al.
5,377,864 A 1/1995 Blechl et al.
5,392,951 A * 2/1995 Gardner et al. ............ 312/319.5
5,405,048 A 4/1995 Rogers et al.
5,431,299 A 7/1995 Brewer et al.
5,460,294 A 10/1995 Williams
5,468,110 A 11/1995 McDonald et al.
5,480,062 A 1/1996 Rogers et al.
5,520,450 A 5/1996 Colson, Jr. et al.
5,564,803 A 10/1996 McDonald et al.
5,593,267 A 1/1997 McDonald et al.
5,661,978 A 9/1997 Holmes et al.
D384,578 S 10/1997 Wangu et al.
5,713,485 A 2/1998 Liff et al.
5,716,114 A 2/1998 Holmes et al.
5,745,366 A 4/1998 Higham et al.
5,761,877 A 6/1998 Quandt
5,797,515 A 8/1998 Liff et al.
5,805,456 A 9/1998 Higham et al.
5,842,976 A 12/1998 Williamson
5,878,885 A 3/1999 Wangu et al.
5,880,443 A 3/1999 McDonald et al.
5,883,806 A 3/1999 Meador et al.
5,893,697 A 4/1999 Zini et al.
5,905,653 A * 5/1999 Higham et al. ............... 700/244
5,912,818 A 6/1999 McGrady et al.
5,927,540 A * 7/1999 Godlewski ........................ 221/2
5,940,306 A * 8/1999 Gardner et al. ............... 700/244
5,971,593 A 10/1999 McGrady
6,003,006 A 12/1999 Colella et al.
6,011,999 A * 1/2000 Holmes ......................... 700/231
6,021,392 A 2/2000 Lester et al.
6,039,467 A 3/2000 Holmes
6,065,819 A 5/2000 Holmes et al.
6,068,156 A 5/2000 Liff et al.
6,109,774 A * 8/2000 Holmes et al. ................ 700/231
6,112,502 A 9/2000 Frederick et al.
6,116,461 A 9/2000 Broadfield et al.
6,151,536 A 11/2000 Arnold et al.
6,170,230 B1 1/2001 Chudy et al.
6,176,392 B1 1/2001 William et al.
6,189,727 B1 2/2001 Shoenfeld
6,223,934 B1 5/2001 Shoenfeld
6,256,967 B1 7/2001 Hebron et al.
6,283,322 B1 9/2001 Liff et al.
6,289,656 B1 9/2001 Wangu et al.
6,338,007 B1 1/2002 Broadfield et al.
6,339,732 B1 1/2002 Phoon et al.
6,361,263 B1 3/2002 Dewey et al.
6,370,841 B1 4/2002 Chudy et al.
6,449,927 B2 9/2002 Hebron et al.
6,471,089 B2 10/2002 Liff et al.
6,497,342 B2 12/2002 Zhang et al.
6,499,270 B2 12/2002 Peroni et al.
6,532,399 B2 3/2003 Mase
6,564,121 B1 5/2003 Wallace et al.
6,581,798 B2 6/2003 Liff et al.
6,609,047 B1 8/2003 Lipps
6,611,733 B1 8/2003 De La Huerga
6,625,952 B1 9/2003 Chudy et al.
6,640,159 B2 10/2003 Holmes et al.
6,650,964 B2 11/2003 Spano, Jr. et al.
6,671,579 B2 12/2003 Spano, Jr. et al.
6,681,149 B2 1/2004 William et al.
6,742,671 B2 6/2004 Hebron et al.
6,755,931 B2 6/2004 Vollm et al.
6,760,643 B2 7/2004 Lipps
6,776,304 B2 8/2004 Liff et al.
6,785,589 B2 8/2004 Eggenberger et al.
6,790,198 B1 9/2004 White et al.
6,814,254 B2 11/2004 Liff et al.
6,814,255 B2 11/2004 Liff et al.
6,847,861 B2 1/2005 Lunak et al.
6,874,684 B1 4/2005 Denenberg et al.
6,892,780 B2 5/2005 Vollm et al.
6,895,304 B2 5/2005 Spano, Jr. et al.
6,975,922 B2 12/2005 Duncan et al.
6,985,797 B2 1/2006 Spano, Jr. et al.
6,996,455 B2 2/2006 Eggenberger et al.
7,010,389 B2 3/2006 Lunak et al.
7,014,063 B2 3/2006 Shows et al.
7,016,766 B2 3/2006 William et al.
7,040,504 B2 5/2006 Broadfield et al.
7,052,097 B2 * 5/2006 Meek et al. ................... 312/222
7,072,737 B2 7/2006 Lunak et al.
7,072,855 B1 7/2006 Godlewski et al.
7,077,286 B2 7/2006 Shows et al.
7,085,621 B2 8/2006 Spano, Jr. et al.
7,092,796 B2 8/2006 Vanderveen
7,093,755 B2 8/2006 Jordan et al.
7,100,792 B2 9/2006 Hunter et al.
7,103,419 B2 9/2006 Engleson et al.
7,111,780 B2 9/2006 Broussard et al.
7,139,639 B2 11/2006 Broussard et al.
7,150,724 B2 12/2006 Morris et al.
7,159,957 B2 * 1/2007 Huber et al. .................. 312/331
7,171,277 B2 1/2007 Engleson et al.
7,218,231 B2 5/2007 Higham
7,228,198 B2 6/2007 Vollm et al.
7,249,688 B2 7/2007 Hunter et al.
7,348,884 B2 3/2008 Higham
7,417,729 B2 8/2008 Greenwald
7,419,133 B2 9/2008 Clarke et al.
7,426,425 B2 9/2008 Meek, Jr. et al.
7,475,562 B2 * 1/2009 Jackovin ......................... 62/344
7,554,449 B2 6/2009 Higham
7,571,024 B2 8/2009 Duncan et al.
7,588,167 B2 9/2009 Hunter et al.
8,103,379 B2 * 1/2012 Biba et al. ..................... 700/243
8,140,187 B2 * 3/2012 Campbell et al. ............. 700/242
8,169,175 B2 * 5/2012 Yu et al. ........................ 318/466
8,197,017 B2 * 6/2012 Rahilly ......................... 312/222

OTHER PUBLICATIONS

Amazon.com: Apex Weekly Pill Organizer, Twice-a-Day, 1 Pill Organizer (Colors May . . . [online] [retrieved Feb. 18, 2011]. Retrieved from the Internet: <URL: http://www.amazon.com/Apex-Weekly-Organizer-Twice-Colors/dp/B000EGKTEW>. 6 pages.

* cited by examiner

DRAWER ASSEMBLY AND ASSOCIATED METHOD FOR CONTROLLABLY LIMITING THE SLIDEABLE EXTENSION OF A DRAWER

TECHNOLOGICAL FIELD

Embodiments of the present invention relate generally to drawer assemblies and associated methods and, more particularly, to drawer assemblies and associated methods that controllably limit the slideable extension of a drawer relative to a cabinet body of a medication dispensing cabinet.

BACKGROUND

Medication dispensing cabinets have been developed in order to store and controllably dispense a variety of medications. A medication dispensing cabinet may include a cabinet body with one or more drawers that are slideably disposed within the cabinet body. The drawers store the various medications. While some of the drawers may be unlatched and freely openable, other drawers may be locked in order to more closely control access to the medications stored in the locked drawers.

Some medication dispensing cabinets are automated and, as such, include or are otherwise associated with a computer that controls access to the medication stored within the cabinet. The computer may allow access to only authorized users, such as medical providers who work in the unit in which the medication dispensing cabinet is located. Once authorized by the computer, a medical provider may identify a particular medication to be dispensed, such as by reference to the medications prescribed to a respective patient to whom the medical provider is attending. The computer may then unlock the respective drawer in which the particular medication is stored so as to provide access to the medication.

Even when unlocked, some drawers are controllably limited in the amount that the drawer may be slideably extended from the cabinet body. For example, a drawer may include a series of pockets or storage locations arranged in a linear fashion from the front to the rear of the cabinet. Each pocket may include a predefined quantity of medication, such as a single or unit dose of a medication. In an instance in which each pocket of a drawer is filled with medication, such as following restocking of the medication dispensing cabinet, a computer, in response to a request to dispense a unit dose of the medication, will unlock the drawer, but limit the extension of the drawer relative to the cabinet body such that a single pocket, that is, the pocket that is closest to the front of the cabinet, is exposed, while the other pockets remain within the cabinet body and are inaccessible. Once the medical provider has removed the medication from the first pocket, the drawer may be reinserted into the cabinet and locked.

Thereafter, in response to a request for another unit dose of the medicine, the computer may cause the drawer to be unlocked and may permit the drawer to be opened so that the first two pockets, that is, the two pockets closest to the front of the cabinet, are accessible, while the remainder of the pockets remain inaccessible within the cabinet. Even though two pockets are accessible, the medication has previously been removed from the first pocket such that the medical provider can only obtain the medication stored within the second pocket. The computer may maintain a record of the pockets that have been accessed within a respective drawer and/or the pockets in a drawer that still store medication. Based upon this information, the computer may not only unlock a drawer in response to a request for the medication, but may control the extent to which the drawer may be extended so as to permit access to only the prescribed dose of the medication, while continuing to prevent access to other pockets of the drawer that still also include the additional quantities of medication. By controlling the extent to which a drawer may be extended from a cabinet, an automated medication dispensing cabinet may maintain control over both the medication that is accessible and the quantity of the medication that is accessible.

In order to limit the extension of a drawer, at least some medication dispensing cabinets include electronically actuated drawers that require electrical wires or other cabling to extend lengthwise along the drawer, such as from the front face of the drawer towards a rear portion of the drawer. As a result of the relative movement of the drawer with respect to the cabinet, medication dispensing cabinets must be designed to ensure that the wiring or other cabling does not interfere with the movement of the drawer and, conversely, that the movement of the drawer does not impinge upon or otherwise damage the wiring or other cabling. As such, the wiring or other cabling associated with a drawer may increase the complexity of the design of the drawer as well as the overall cabinet.

In some instances, the limitation imposed upon the extension of a drawer could be overcome if a pulling force was applied to the drawer that was substantial and/or that was very soon after the drawer had been unlocked. In instances in which the limitation upon the extension of a drawer were overcome, the medical provider could have access to a larger quantity of the medication than was intended to be dispensed and a larger quantity of the medication than is required by the medical provider to satisfy the particular prescription that is being fulfilled.

BRIEF SUMMARY

A cabinet, a drawer assembly and an associated method are provided for controllably limiting the slideable extension of a drawer relative to a cabinet body. By controllably limiting the slideable extension of a drawer, the cabinet may permit access to a desired quantity of the medication stored within the drawer, while limiting access to additional quantities of the medication beyond that which is to be dispensed. The drawer assembly of one embodiment need not include wiring or cabling that extends along the length of the drawer so as to simplify the design of the drawer and the resulting cabinet. Additionally, the drawer assembly of one embodiment provides a secure stop to further extension of the drawer so as to limit, or eliminate, instances in which the limitations imposed upon the extension of the drawer are overcome.

In one embodiment, a cabinet is provided for storing a plurality of medications and includes a cabinet body, a drawer slideably disposed within the cabinet body and an extension control rod. The drawer may include a plurality of pockets for storing respective medications. The drawer may also include an outwardly extending engagement member. The extension control rod of this embodiment includes a plurality of outwardly extending projections that are arranged helically about the rod. As such, engagement of a projection of the extension control rod with the engagement member of the drawer limits further slideable extension of the drawer relative to the cabinet body.

The extension control rod of one embodiment is rotatable about a longitudinal axis so as to bring different respective projections into contact with the engagement member of the drawer. The cabinet of this embodiment may include a motor for controllably rotating the extension control rod. The cabinet of this embodiment may also include a counter for cooperating with the motor to control rotation of the extension control rod. The outwardly extending projections of the extension control rod may be spaced lengthwise along the rod by a pitch corresponding to a pitch of the pockets. The outwardly extending projections of the extension control rod may also be at different angular positions about the rod and the extension control rod may be positionable such that only a single projection of the extension control rod engages the engagement member of the drawer.

In another embodiment, a drawer assembly is provided that includes a drawer having a plurality of pockets for storing respective medications and an extension control rod for limiting the slideable extension of the drawer. The drawer of this embodiment includes an outwardly extending engagement member. The extension control member may also include a plurality of outwardly extending projections. The projections may be spaced lengthwise along the rod and positioned at different angular positions about the rod. As a result of the engagement of a projection of the extension control rod with the engagement member of the drawer, further slideable extension of the drawer may be controllably limited.

The plurality of outwardly extending projections may be arranged helically about the rod. The extension control rod may be rotatable about a longitudinal axis so as to bring different respective projections into contact with the engagement member of the drawer. The drawer assembly may also include a motor for controllably rotating the extension control rod. In this embodiment, the drawer assembly may further include a counter for cooperating with the motor to control rotation of the extension control rod. The outwardly extending projections of the extension control rod may be spaced lengthwise along the rod by a pitch corresponding to a pitch of the pockets. The extension control rod may be positionable such that only a single projection of the extension control rod engages the engagement member of the drawer. In one embodiment, a distal end of the engagement member of the drawer may include chamfered corner portions so as to facilitate contact with only a single projection of the extension control rod.

In a further embodiment, a method for controlling extension of a drawer is provided. The method may include rotating an extension control rod that includes a plurality of outwardly extending projections that are arranged helically about the rod. The rotation of the extension control rod may include positioning the rod such that a respective projection extends toward the drawer. The method of this embodiment also includes limiting the extension of the drawer as a result of the engagement of the respective projection of the extension control rod with an engagement member of the drawer.

The drawer of one embodiment includes a plurality of pockets. In this embodiment, limiting the extension of the drawer includes permitting at least one pocket to be accessed while preventing at least one other pocket from being accessed. The outwardly extending projections of the extension control rod of this embodiment may be spaced lengthwise along the rod by a pitch corresponding to a pitch of the pockets.

In one embodiment, positioning the rod may include positioning the rod such that only a single projection of the extension control rod engages the engagement member of the drawer. The rotation of the extension control rod may also include rotating the extension control rod about a longitudinal axis so as to bring different respective projections into contact with the engagement member of the drawer. The method of one embodiment may also include unlocking the drawer following rotation of the extension control rod to permit subsequent extension of the drawer to the limit imposed by engagement of the respective projection of the extension control rod with the engagement member of the drawer.

BRIEF DESCRIPTION OF SEVERAL VIEWS OF THE DRAWINGS

Reference will now be made to the accompanying drawings, which are not necessarily drawn to scale, and wherein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
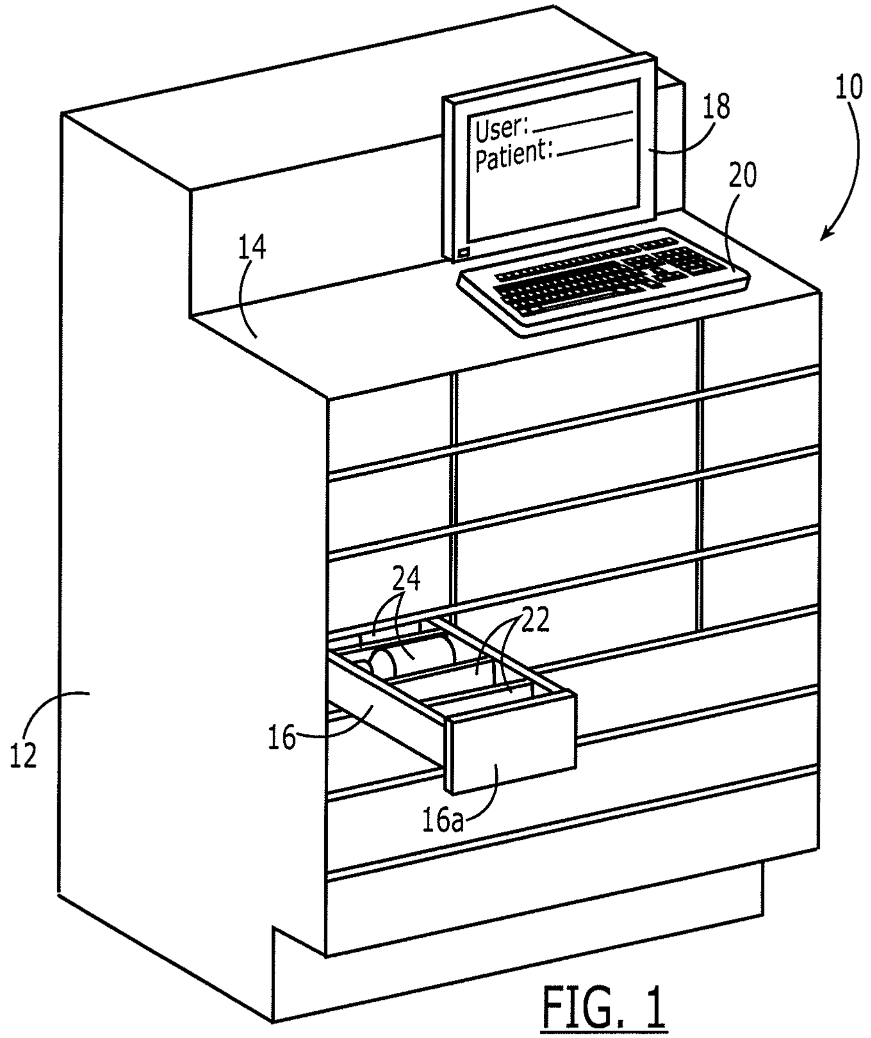
FIG. 1 is a perspective view of a cabinet in which one drawer is partially opened in accordance with one embodiment of the present invention.

Referring now to FIG. 1, a cabinet 10 for storing a plurality of medications in accordance with one embodiment of the present invention is illustrated. As shown, the cabinet may include a cabinet body 12 having an upper work surface 14 and defining an internal cavity. The cabinet also includes one or more drawers 16 that are slideably disposed within the cabinet body, such as within the internal cavity defined by the cabinet body. The cabinet of one embodiment may be automated and, as such, may include a computer, such as a personal computer, work station or the like, for controlling access to the medications stored by the cabinet. As shown in FIG. 1, the computer may be carried by the cabinet and may include a display 18, a keyboard 20, a processing unit (not shown) including or associated with a memory device, and the like. Alternatively, the computer or at least the processing unit may be remote from the cabinet body, but may be associated with and in communication with the cabinet body and the drawers so as to control access to the plurality of medications.

Figure 2:
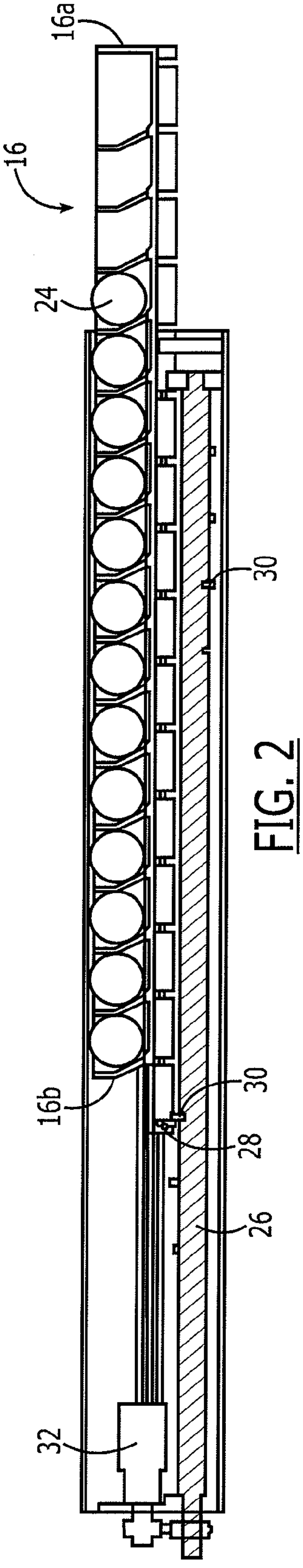
FIG. 2 is a cross-sectional side view of a drawer assembly according to one embodiment of the present invention.

As also shown in FIG. 1, once unlocked, a drawer 16 may be slideably extended relative to the cabinet body 12. In one embodiment, a drawer includes a plurality of pockets 22 or storage locations for the medication. While different medications may be stored in the different pockets, a drawer of one embodiment stores the same medication within each of the pockets. While the quantity of the medication stored in each pocket may vary, the drawer of one embodiment stores the same quantity of the same medication in each pocket, such as a unit or single dose of the medication. As shown in FIG. 2, for example, a bottle or other container 22 may be disposed within each respective pocket with the bottle containing a unit dose of the medication. However, the medication may be disposed in the pocket in other manners, such as by merely placing tablets, pills or the like within the pocket. The pockets of the illustrated embodiment have an open top and are therefore freely accessible once the drawer has been slideably extended from the cabinet body to such an extent that a bottle is exposed. Alternatively, one or more of the pockets may include a lid that, in some embodiments, may be latched or locked to further control access to the medications within the respective pocket.

The drawer 16 is controlled so as to limit the slideable extension of the drawer relative to the cabinet body 12. In this regard, the computer associated with the cabinet may control or limit the extent to which the drawer may be slidably extended such that the medication within the pockets 22 that is exposed and is accessible following the slideable extension of the drawer is limited, such as to a single unit dose or to some other predefined quantity that is consistent with the prescription currently being fulfilled. In this regard, the computer associated with the cabinet 10 may be configured to track the pockets that have been previously accessed or at least previously exposed as well as the pockets that have not yet been accessed and which therefore still include medication. As shown in FIG. 2, the pockets proximate the front 16*a* of the drawer are generally initially accessed, while the pockets proximate the rear 16*b* of the drawer are generally accessed at a later time and therefore continue to store medication until such time that they have been accessed.

In an instance in which a unit dose of medication is to be dispensed, the cabinet 10 of one embodiment of the present invention may permit the slideable extension of the drawer 16 to such an extent that a single pocket 22 that includes medication is exposed. In instances in which medication has previously been removed from one or more pockets adjacent the front 16*a* of the drawer, the cabinet may permit the drawer to be slideably extended such that the empty pocket(s) proximate the front of the drawer are accessible, along with a single pocket that still includes medication that may be accessed in order to fulfill the prescription, as shown in FIG. 2.

The cabinet 10 includes a drawer assembly that is configured in accordance with the embodiments of the present invention to controllably limit the slideable extension of the drawer 16 relative to the cabinet body 12. The drawer assembly includes a drawer and, as shown in FIG. 2, an extension control rod 26 that cooperates with the drawer to controllably limit the slideable extension of the drawer. In the illustrated embodiment, the drawer includes an outwardly extending engagement member 28. While the drawer assembly may be configured in various manners with the extension control rod positioned at different relative locations with respect to the drawer, the drawer of one embodiment is positioned immediately above the extension control rod. As such, the outwardly extending engagement member of the drawer of this embodiment extends downwardly from the drawer. In the illustrated embodiment, the outwardly extending member extends downwardly from a rear portion 16*b* of the drawer. However, the outwardly extending engagement member can extend outwardly from other portions of the drawer, if so desired.

The extension control rod 26 may be mounted or connected to the cabinet body 12 and may extend lengthwise alongside the drawer 16, at least while the drawer is disposed within the cabinet body 12. The extension control rod includes a plurality of outwardly extending projections 30. These outwardly extending projections are spaced lengthwise along the rod and are positioned at different angular positions about the rod. In one embodiment, the spacing of the projections in a lengthwise direction along the rod establishes an equal spacing between adjacent projections. In this regard, the pitch of the projections in a lengthwise direction, that is, the spacing in a lengthwise direction from the center of one projection to the center of an adjacent projection is equal to the pitch of the pockets 22 of the drawer.

Figure 3:
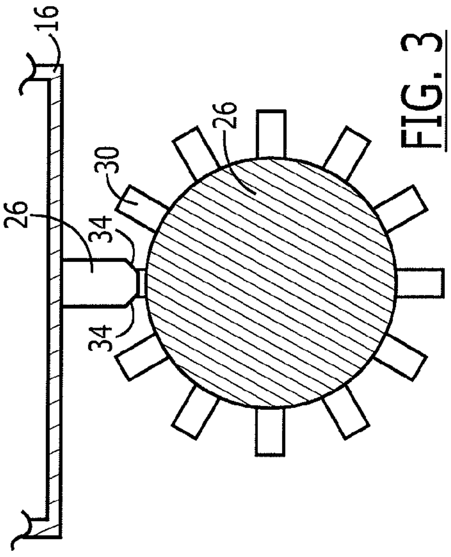
FIG. 3 is a fragmentary cross-sectional view of the extension control rod and the outwardly extending engagement member of a drawer in accordance with one embodiment of the present invention.

Additionally, the different angular positions of the projections 30 about the rod 26 are generally such that there is equal angular spacing between each adjacent projection, as shown in FIG. 3. As such, the plurality of outwardly extending projections may be arranged helically about the rod. In this regard, the helical arrangement of the projections may extend once about the rod, but does not generally extend more than one time about the rod. Thus, the angular extent of the helix is generally 360° or less. While the equal angular separation between adjacent projections may vary, the angular separation between projections of one embodiment is dependent upon the number of projections. In this regard, the number of projections may equal the number of pockets 22 of the drawer 16. Thus, in an instance in which the drawer has twelve pockets, the extension control rod may also include twelve outwardly extending projections that are arranged in a helix that extends 360° about the rod such that the projections are spaced apart from one another by 360°/12 or 30°.

Figure 4:
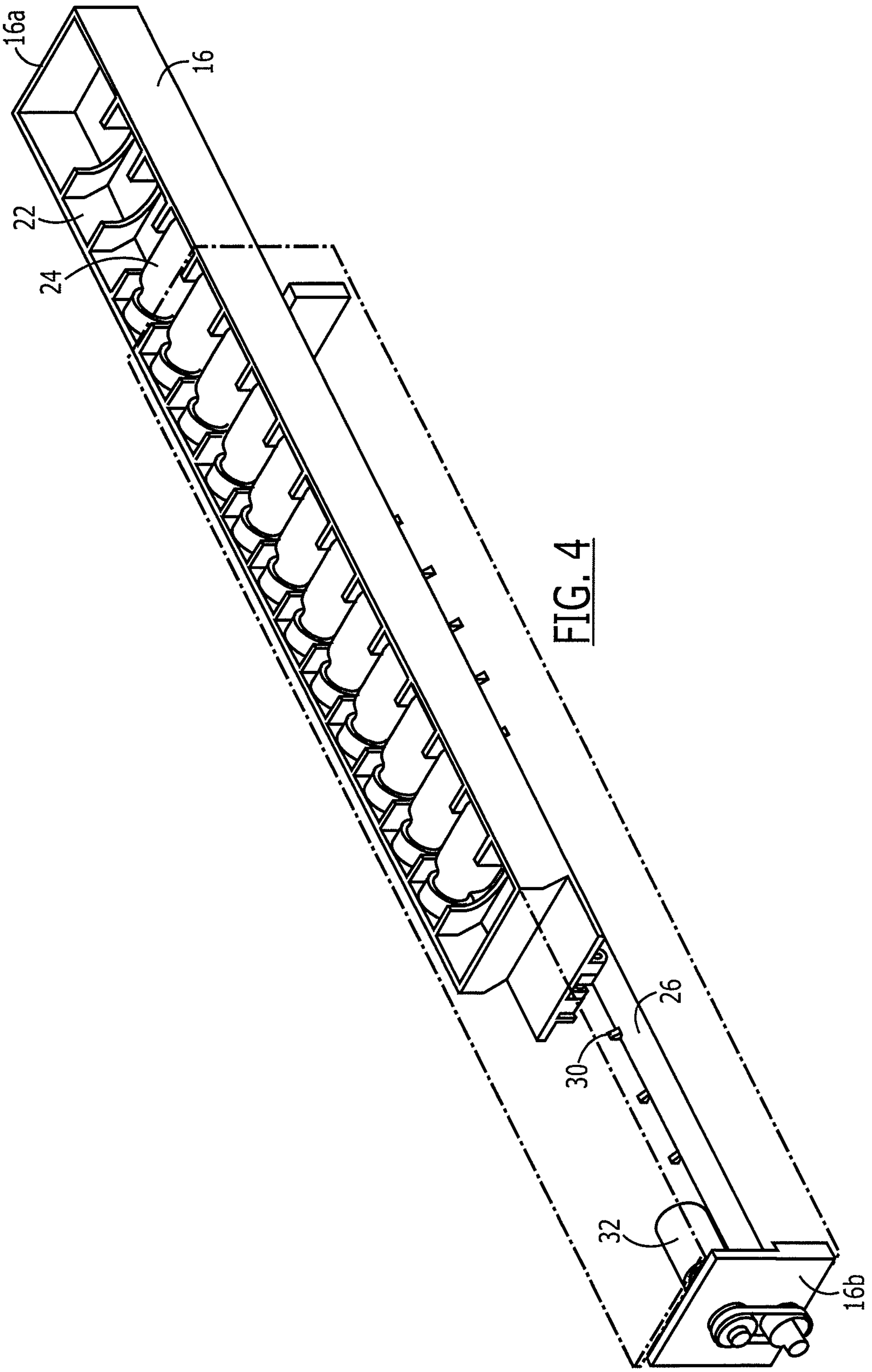
FIG. 4 is a perspective view of a drawer assembly in accordance with one embodiment of the present invention.

As described below, the extension control rod 26 serves to limit the slideable extension of the drawer 16 by the engagement of or contact between an outwardly extending projection 30 of the extension control rod and the engagement member 28 of the drawer. As described below, the extension control rod is rotatable relative to its longitudinal axis. While the extension control rod may be controllably rotated using various manners, the drawer assembly of one embodiment includes a motor assembly 32 which, in turn, includes a motor, such as a DC motor, for controllably rotating the extension control rod, as shown in FIG. 4. In one embodiment, the motor assembly may also include a counter that cooperates with the motor to control the rotation of the extension control rod such that the extension control rod is controllably rotated until a desired projection extends toward the drawer so as to engage the engagement member of the drawer as the drawer is slideably extended, thereby controllably limiting further slideable extension of the drawer.

As shown in FIGS. 2 and 4, the motor assembly 32 may be directly connected to the extension control rod 26 and, in one embodiment, may be mounted to or otherwise carried by the cabinet body 12. As such, the drawer assembly does not require wiring or cabling that extends along the length of the drawer 16. Instead, the computer may communicate with the motor assembly either wirelessly or via wires or other cabling that extends along the cabinet body, such as along a rear surface of the cabinet body. By eliminating the wiring or other cabling that otherwise extended along the length of the drawer, the design and operational reliability of the drawer may be enhanced.

As such, the extension control rod 26 is positionable, such as by the controlled rotation provided by the motor and the associated counter, such that only a single projection 30 of the extension control rod engages the engagement member 28 of the drawer 16. Indeed, the counter may control the motor based upon the extent that the drawer is to be opened, e.g., the number of pockets 22 to be accessible, such that the motor rotates the rod to bring a particular projection into alignment with the engagement member of the drawer that will limit extension of the drawer in the desired manner. The other projections of the extension control rod, that is, the projections that are not to be aligned with the engagement member, are sufficiently angularly offset from the engagement member of the drawer so as not to make contact with the engagement member of the drawer. In order to facilitate the engagement of a single projection of the extension control rod by the engagement member of the drawer, the engagement member of the drawer may be shaped, such as by including a distal end having chamfered corner portions 34, in order to provide additional clearance relative to adjacent projections of the extension control rod, as shown in FIG. 3.

Figure 5:
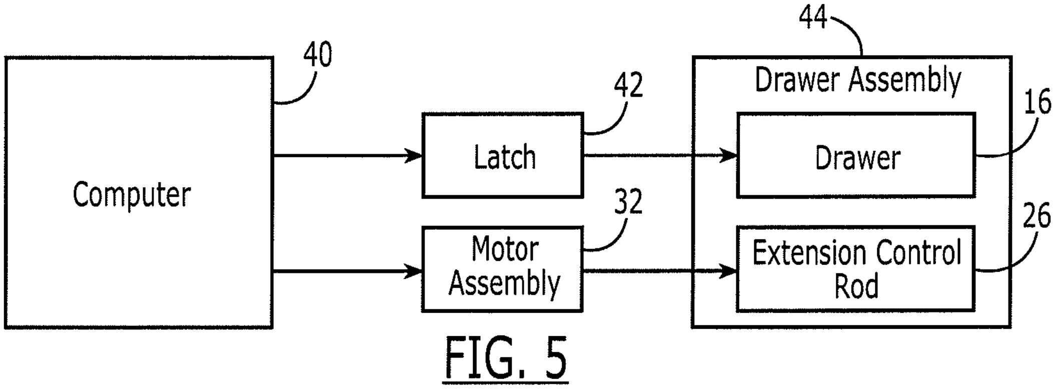
FIG. 5 is a block diagram of a drawer assembly in accordance with one embodiment of the present invention.
Figure 6:
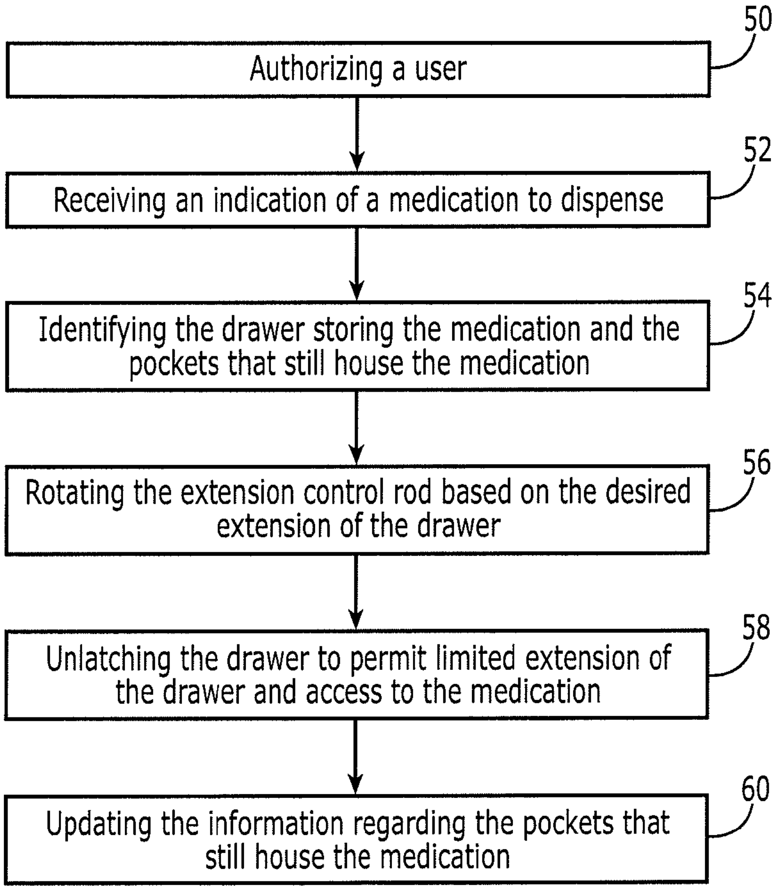
FIG. 6 is a flow chart illustrating operations performed in accordance with an embodiment of the present invention.

In operation, the drawer 16 to be unlocked and slideably extended is initially identified. With reference to FIGS. 5 and 6 and in regard to an automated medication dispensing cabinet, for example, the computer 40 associated with the cabinet 10 may authorize a user, such as a medical provider, and may then receive information identifying a medication to be dispensed, such as by reference to a patient's medication profile or prescription. See blocks 50 and 52 of FIG. 6. Based upon the medication to be dispensed, the computer may identify a drawer 16 that houses the medication and may identify the first pocket(s) 22 that stores the desired quantity of the medication. See block 54 of FIG. 6. By way of example, a medication that is to be dispensed may be stored in a drawer that has twelve pockets. The computer may include or have access to information indicating that the first three pockets are empty as a result of prior dispensing operations, while the subsequent nine pockets are filled with respective unit doses of the medication. While the cabinet may include sensors for detecting the presence or absence of medication within specific pockets, the computer may conclude that a pocket no longer contains medication in an instance in which the drawer has been opened to such a degree that the pocket is accessible. In order to dispense a unit dose of the medication in the foregoing example of a drawer having twelve pockets, the computer may not only identify the drawer in which the medication is stored, but may also identify that the drawer is to be opened only to such a degree that four pockets are exposed, namely, the first three empty pockets and the fourth pocket storing a unit dose of the medication, so as to permit the desired quantity, but no more, of the medication to be accessible.

Based upon this determination, the computer 40 may direct or signal the motor assembly 32, such as the motor and associated counter, to rotate the extension control rod 26 to such a degree that the outwardly extending projection 30 that is associated with the fourth pocket (as counted from the front 16*a* of the drawer 16) will extend toward and contact the engagement member 28 of the drawer. See block 56 of FIG. 6. In one embodiment in which the extension control rod includes equal numbers of projections as drawers and in which the outwardly extending engagement member is carried by the rear end 16*b* of the drawer, there may be an inverse positional relationship between the order of the pockets 22 and the order of the projections such that the outwardly extending projection that is associated with the fourth pocket may be the fourth projection from the rear of the extension control rod. Once the extension control rod has been appropriately rotated, the drawer may be unlocked, such as based upon communication between the computer and a latch 42 associated with the drawer assembly 44. See block 58 of FIG. 6. In one embodiment, the computer may then direct the medical provider to open the unlocked drawer.

In this regard, the medical provider may slide the drawer 16 outwardly from the cabinet 10 until the outwardly extending projection 30 engages the engagement member 28 of the drawer, thereby limiting the extension of the drawer so that only the first four pockets are exposed, namely, the first three empty pockets and the fourth pocket that stores a unit dose of the desired medication. By having properly rotated the extension control rod 26 prior to permitting the drawer to be slideably extended and by employing physical contact between the engagement member of the drawer and the projection of the extension control rod, the slideable extension of the drawer may be limited in such a manner that it may not be readily overcome by the exertion of additional force or by the timing of the exertion of the additional force. Once a drawer is opened such that the fourth pocket is exposed, the computer 40 may update the information associated with the medication stored within the drawer to indicate that the medication from the first four drawers have now been accessed. See block 60 of FIG. 6. As such, any subsequent request for dispensation of the medication stored in the drawer will cause the computer to direct the rotation of the extension control rod such that the next pocket, that is, the fifth pocket, is exposed since the preceding four pockets will now be considered empty.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A cabinet for storing a plurality of medications, the cabinet comprising:
- a cabinet body;
- a drawer slideably disposed within the cabinet body and configured for slidable movement in a lengthwise direction, wherein the drawer comprises a plurality of pockets for storing respective medications, and wherein the drawer comprises an outwardly extending engagement member; and
- an extension control rod extending in the lengthwise direction alongside the drawer, the extension control rod comprising a plurality of outwardly extending projections that are arranged helically about the rod such that engagement of a projection of the extension control rod with the engagement member of the drawer limits further slideable extension of the drawer relative to the cabinet body,
- wherein the extension control rod is configured to be rotatably positioned prior to opening of the drawer to permit access to a respective pocket and to remain in position without further rotation while the drawer is opened to permit access to the respective pocket.

2. A cabinet according to claim 1 wherein the extension control rod is rotatable about a longitudinal axis so as to bring different respective projections into contact with the engagement member of the drawer.

3. A cabinet according to claim 2 further comprising a motor for controllably rotating the extension control rod.

4. A cabinet according to claim 3 further comprising a counter for cooperating with the motor to control rotation of the extension control rod.

5. A cabinet according to claim 1 wherein the outwardly extending projections of the extension control rod are spaced lengthwise along the rod by a pitch corresponding to a pitch of the pockets.

6. A cabinet according to claim 1 wherein the outwardly extending projections of the extension control rod are at different angular positions about the rod, and wherein the extension control rod is positionable such that only a single projection of the extension control rod engages the engagement member of the drawer.

7. A drawer assembly comprising:

a drawer comprising a plurality of pockets for storing respective medications, wherein the drawer comprises an outwardly extending engagement member; and an extension control rod extending in a lengthwise direction alongside the drawer, the extension control rod comprising a plurality of outwardly extending projections, wherein the projections are spaced lengthwise along the rod and are positioned at different angular positions about the rod, wherein engagement of a projection of the extension control rod with the engagement member of the drawer limits further slideable extension of the drawer in the lengthwise direction, wherein the extension control rod is configured to be rotatably positioned prior to opening of the drawer to permit access to a respective pocket and to remain in position without further rotation while the drawer is opened to permit access to the respective pocket.

8. A drawer assembly according to claim 7 wherein the plurality of outwardly extending projections are arranged helically about the rod.

9. A drawer assembly according to claim 7 wherein the extension control rod is rotatable about a longitudinal axis so as to bring different respective projections into contact with the engagement member of the drawer.

10. A drawer assembly according to claim 9 further comprising a motor for controllably rotating the extension control rod.

11. A drawer assembly according to claim 10 further comprising a counter for cooperating with the motor to control rotation of the extension control rod.

12. A drawer assembly according to claim 7 wherein the outwardly extending projections of the extension control rod are spaced lengthwise along the rod by a pitch corresponding to a pitch of the pockets.

13. A drawer assembly according to claim 7 wherein the extension control rod is positionable such that only a single projection of the extension control rod engages the engagement member of the drawer.

14. A drawer assembly according to claim 7 wherein a distal end of the engagement member of the drawer comprises chamfered corner portions.

15. A method for controlling extension of a drawer in a lengthwise direction, the drawer comprising a plurality of pockets, the method comprising:

rotating an extension control rod that extends in the lengthwise direction alongside the drawer and comprises a plurality of outwardly extending projections that are arranged helically about the rod, wherein rotating the extension control rod comprises positioning the rod such that a respective projection extends toward the drawer, and wherein rotating the extension control rod comprises rotatably positioning the extension control rod prior to opening of the drawer to permit access to a respective pocket; and limiting the extension of the drawer as a result of engagement of the respective projection of the extension control rod with an engagement member of the drawer with the extension control rod remaining in position without further rotation while the drawer is opened to permit access to the respective pocket.

16. A method according to claim 15 wherein limiting the extension of the drawer comprises permitting at least one pocket to be accessed while preventing at least one other pocket from being accessed.

17. A method according to claim 16 wherein the outwardly extending projections of the extension control rod are spaced lengthwise along the rod by a pitch corresponding to a pitch of the pockets.

18. A method according to claim 15 wherein positioning the rod comprises positioning the rod such that only a single projection of the extension control rod engages the engagement member of the drawer.

19. A method according to claim 15 wherein rotating the extension control rod comprises rotating the extension control rod about a longitudinal axis so as to bring different respective projections into contact with the engagement member of the drawer.

20. A method according to claim 15 further comprising unlocking the drawer following rotation of the extension control rod to permit subsequent extension of the drawer to a limit imposed by the engagement of the respective projection of the extension control rod with the engagement member of the drawer.

* * * * *